(12) United States Patent
Akamoto et al.

(10) Patent No.: US 9,803,776 B2
(45) Date of Patent: Oct. 31, 2017

(54) LOCK DEVICE AND VALVE DEVICE

(71) Applicant: Fujikin Incorporated, Osaka (JP)

(72) Inventors: Hisatoshi Akamoto, Osaka (JP); Izuru Shikata, Osaka (JP); Ryutaro Tanno, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 14/785,106

(22) PCT Filed: Apr. 11, 2014

(86) PCT No.: PCT/JP2014/002086
§ 371 (c)(1),
(2) Date: Oct. 16, 2015

(87) PCT Pub. No.: WO2014/171120
PCT Pub. Date: Oct. 23, 2014

(65) Prior Publication Data
US 2016/0091111 A1    Mar. 31, 2016

(30) Foreign Application Priority Data

Apr. 17, 2013 (JP) .................................. 2013-086280

(51) Int. Cl.
*F16K 35/02* (2006.01)
*F16K 35/06* (2006.01)
(Continued)

(52) U.S. Cl.
CPC ................ *F16K 35/06* (2013.01); *F16K 7/12* (2013.01); *F16K 35/02* (2013.01); *F16K 35/025* (2013.01); *Y10T 137/7256* (2015.04)

(58) Field of Classification Search
CPC .......... F16K 7/12; F16K 35/02; F16K 35/022; F16K 35/025; F16K 35/027; F16K 35/06; F16K 35/10; Y10T 137/7256
(Continued)

(56) References Cited

U.S. PATENT DOCUMENTS 664,462 A * 12/1900 Campbell ............... F16K 35/10
137/382
983,842 A * 2/1911 Schneible ............... F16K 35/10
137/385
(Continued)

FOREIGN PATENT DOCUMENTS

JP     241633 Y1    3/1949
JP     2146393 A    6/1990
(Continued)

*Primary Examiner* — Mary McManmon
*Assistant Examiner* — Jonathan Waddy
(74) *Attorney, Agent, or Firm* — The Webb Law Firm (57) ABSTRACT

Provided are a valve device free of changes in the position of the valve member caused by external force and fluid pressure, and a lock device for the valve device. The lock device has a tubular member fitted to the rotating part of the valve device so that the member is movable along the axis of the rotating part in both directions, wherein the member has a protrusion on its inner circumferential face along its axis, and the protrusion engages with or disengages from recesses in an outer circumferential face of a holder of the rotating part formed along its axis when the member moves in either direction; or the member has recesses in its inner circumferential face formed along its axis, and the recesses engage with or disengage from a protrusion on the outer circumferential face of the holder along its axis when the member moves in either direction.

16 Claims, 5 Drawing Sheets

(51) Int. Cl.
*F16K 35/10* (2006.01)
*F16K 7/12* (2006.01)

(58) Field of Classification Search
USPC ............ 137/385; 251/89.5, 92, 288; 70/177
See application file for complete search history.

(56) References Cited

U.S. PATENT DOCUMENTS

| | | | |
|---|---|---|---|
| 2,234,052 A * | 3/1941 | Luenz | F16K 35/00 137/556.3 |
| 5,823,023 A * | 10/1998 | Benda | F16K 35/06 137/385 |
| 6,260,819 B1 | 7/2001 | Ovsepyan | |
| 2005/0035325 A1* | 2/2005 | Balasubramanian | F16K 7/126 251/331 |
| 2009/0039304 A1 | 2/2009 | Ishihara et al. | |

FOREIGN PATENT DOCUMENTS

| | | |
|---|---|---|
| JP | 200097368 A | 4/2000 |
| JP | 2001146977 A | 5/2001 |
| JP | 2012107762 A | 6/2012 |
| JP | 201344143 A | 3/2013 |

* cited by examiner

LOCK DEVICE AND VALVE DEVICE

CROSS-REFERENCE TO RELATED APPLICATIONS

This application is the United States national phase of International Application No. PCT/JP2014/002086 filed Apr. 11, 2014, and claims priority to Japanese Patent Application No. 2013-086280 filed Apr. 17, 2013, the disclosures of which are hereby incorporated in their entirety by reference.

TECHNICAL FIELD

The present invention relates to a lock device and a valve device. More particularly, the invention relates to a lock device capable of locking the opening and closing positions of a valve member which opens and closes the flow path and to a valve device equipped with the lock device.

BACKGROUND ART

A conventional valve device with a valve member for opening and closing the flow path, operated, for example, by manually turning a handle, requires keeping the position of the valve member unmoved so that the open/closed state of the valve remains constant, in order to make constant the flow rate of fluid passing through the valve. In order to make the flow rate constant at various operation states including the state where the flow rate is zero, the valve device is equipped with a lock device.

The lock device disclosed in patent document 1 is one conventional lock device.

The lock device disclosed in patent document 1 is "a lock device for locking a vertical position of a handle of a manually operated fluid flow controller, the lock device being in the shape of an upside-down turned "L" when it is viewed from the side thereof, comprising a handle-holding part having a hole for receiving a root of the handle; and a fixing part for fixing the lock device to a bottom part of the bonnet of the controller, wherein the fixing part extends downward from a base of the handle-holding part at an angle generally perpendicular to the handle-holding part (see claim 1 of patent document 1)." In short, the lock device disclosed in patent document 1 is a member separate from the valve device and it is in the shape of an upside-down turned "L" when it is viewed from the side thereof. Thus the lock device has to be properly kept in a predetermined place so that it will not be lost. Besides, the handle-holding part of the lock device disclosed in patent document 1 is fixed to the root of the handle by, for example, bolting, which makes the fitting troublesome.

The opening and closing lever device for valves disclosed in patent document 2 is another example of the conventional lock device.

The lever device disclosed in patent document 2 includes "a lever 5 with a locking lever 10 and a plate 9 with locking recesses 9b in the rim thereof, wherein a locking hook 10a engages with either of the recesses 9b when the valve is fully open or completely closed, so that the engagement prevents rotation of the lever 5 and excludes the probability of unintended opening/closing of the valve that may be caused by contact with some objects (see lines 5-11 in the upper right column on page 5 of patent document 2)."

The mechanism of preventing rotation of the lever 5 disclosed in patent document 2, however, will not be able to prevent rotation of the valve stem 4 if the mechanism is applied to a valve device whose valve stem 4 is raised and rotationally moved by a change of the pressure of the fluid.

PRIOR ART DOCUMENTS

Patent Documents

Patent Document 1: JP 2000-097368 A
Patent Document 2: JP H2-146393 A

DISCLOSURE OF THE INVENTION

Problems to be Solved by the Invention

The above-mentioned problems are solved by the present invention which provides a lock device applicable to a valve device comprising a valve member placed in a valve body having an inlet port and an outlet port, the valve member for obstructing the inlet port and the outlet port or allowing the inlet port and the outlet port to communicate with each other, and a rotating part for driving the valve member so as to place the valve member at an obstructing position or at a communicating position, the lock device capable of locking the rotating part in a predetermined position, thereby preventing the rotating part from being rotated by external force and changes in the pressure of the fluid; and a valve device equipped with the lock device. The present invention also provides a lock device applicable to a valve device comprising a valve member placed in a valve body having an inlet port and an outlet port, the valve member for obstructing the inlet port and the outlet port or allowing the inlet port and the outlet port to communicate with each other, and a rotating part for driving the valve member so as to place the valve member at an obstructing position or at a communicating position, the lock device capable of locking the rotating part in a predetermined position, thereby preventing the rotating part from being rotated by external force and changes in the pressure of the fluid and preventing the rotating part from moving along the axis thereof due to changes in the pressure of the fluid; and a valve device equipped with the lock device.

Means to Solve the Problems

The means for solving the problems provided by the present invention are:
(1) A lock device applicable to a valve device comprising:
 a valve member placed in a valve body having an inlet port and an outlet port, the valve member for obstructing the inlet and outlet ports or allowing the inlet and outlet ports to communicate with each other,
 a rotating part rotating around a central axis thereof, for driving the valve member so as to place the valve member at an obstructing position or at a communicating position,
 a rotating part holder for holding the rotating part in such a way that the rotating part is rotatable, and
 an operating part for rotating the rotating part; the lock device comprising:
 a tubular member fitted to the rotating part in such a manner that the tubular member is movable along the central axis of the rotating part in both directions, wherein the tubular member has a first protrusion formed on an inner circumferential face of the tubular member along a central axis of the tubular member, and the first protrusion engages with or disengages from first recesses formed in an outer circumferential face of the rotating part holder along a central axis of the rotating part holder when the tubular member moves in either direction; or the tubular member has second recesses formed in the inner circumferential face of the tubular member along the central axis thereof, and the second recesses engage with or disengage from a second protrusion formed on the outer circumferential face of the rotating part holder along the central axis thereof when the tubular member moves in either direction.

(2) The lock device according to item (1), wherein the first recesses are longitudinal grooves including at least a first longitudinal groove and a second longitudinal groove; and the first protrusion is a pin formed so as to be capable of engaging with the longitudinal grooves, wherein the first longitudinal groove is formed in the outer circumferential face of the rotating part holder at a first position corresponding to the obstructing position, and the second longitudinal groove is formed in the outer circumferential face of the rotating part holder at a second position corresponding to the communicating position.

(3) The lock device according to item (1), wherein the tubular member has an upper recess and a lower recess in the inner circumferential face thereof, the rotating part has an engaging ball capable of sticking out of and withdrawing from the outer circumferential face of the rotating part, and the engaging ball is capable of engaging with the upper recess and the lower recess.

(4) The lock device according to item (1), the valve device further comprising a valve member-fixing part with the valve member at one end, wherein the valve member-fixing part has a guide groove and the rotating part has a moving projection inserted into the guide groove; and wherein the moving projection moves in the guide groove as the rotating part is rotated, so that the valve member-fixing part moves in relation to the rotating part, thereby shifting the valve member at least between the obstructing position and the communicating position.

(5) The lock device according to item (1), wherein the tubular member has an engaging member for engaging with a longitudinal groove running parallel with the central axis of the rotating part, the longitudinal groove formed in the outer circumferential face of the rotating part, whereby the tubular member is prevented from slipping off the rotating part.

(6) The lock device according to item (1), wherein the valve member has a diaphragm.

(7) A valve device comprising:

a valve member placed in a valve body having an inlet port and an outlet port, the valve member for obstructing the inlet and outlet ports or allowing the inlet and outlet ports to communicate with each other, a rotating part rotating around a central axis thereof, for driving the valve member so as to place the valve member at an obstructing position or at a communicating position, a rotating part holder for holding the rotating part in such a way that the rotating part is rotatable, an operating part for rotating the rotating part, and a tubular member fitted to the rotating part in such a manner that the tubular member is movable along the central axis of the rotating part in both directions;

wherein the tubular member has first protrusion formed on an inner circumferential face of the tubular member along a central axis of the tubular member, and the first protrusion engages with or disengages from first recesses formed in an outer circumferential face of the rotating part holder along a central axis of the rotating part holder when the tubular member moves in either direction; or the tubular member has second recesses formed in the inner circumferential face of the tubular member along the central axis thereof, and the second recesses engage with or disengage from a second protrusion formed on the outer circumferential face of the rotating part holder along the central axis thereof when the tubular member moves in either direction.

(8) The valve device according to item (7), wherein the first recesses are longitudinal grooves including at least a first longitudinal groove and a second longitudinal groove; and the first protrusion is a pin formed so as to be capable of engaging with the longitudinal grooves, wherein the first longitudinal groove is formed in the outer circumferential face of the rotating part holder at a first position corresponding to the obstructing position, and the second longitudinal groove is formed in the outer circumferential face of the rotating part holder at a second position corresponding to the communicating position.

(9) The valve device according to item (7), wherein the tubular member has an upper recess and a lower recess in the inner circumferential face thereof, the rotating part has an engaging ball capable of sticking out of and withdrawing from the outer circumferential face of the rotating part, and the engaging ball is capable of engaging with the upper recess and the lower recess.

(10) The valve device according to item (7), further including a valve member-fixing part with the valve member at one end, wherein the valve member-fixing part has a guide groove and the rotating part has a moving projection inserted into the guide groove; and wherein the moving projection moves in the guide groove as the rotating part is rotated, so that the valve member-fixing part moves in relation to the rotating part, thereby shifting the valve member at least between the obstructing position and the communicating position.

(11) The valve device according to item (7), wherein the tubular member has an engaging member for engaging with a longitudinal groove running parallel with the central axis of the rotating part, the longitudinal groove formed in the outer circumferential face of the rotating part, whereby the tubular member is prevented from slipping off the rotating part.

(12) The lock device according to item (7), wherein the valve member has a diaphragm.

Advantages of the Invention

The lock device according to the present invention is incorporated into a valve device. The valve device has a valve member, a rotating part for driving the valve member so as to place the valve member at an obstructing position or at a communicating position, a rotating part holder for holding the rotating part in such away that the rotating part is rotatable, and an operating part for rotating the rotating part. The lock device has a tubular member fitted to the rotating part of the valve device. The tubular member has a first protrusion, such as a pin, formed on the inner circumferential face thereof, and the first protrusion engages with or disengages from first recesses, such as longitudinal grooves, formed in the outer circumferential face of the rotating part holder along the central axis thereof when the tubular member moves in either direction. Alternatively, the tubular member has second recesses, such as grooves, formed in the inner circumferential face of the tubular member along the central axis thereof, and the second recesses engage with or disengage from a second protrusion, such as a pin, formed on the outer circumferential face of the rotating part holder along the central axis thereof when the tubular member moves in either direction.

When the protrusion engages with one of the recesses, the rotating part is prevented from rotating. On the other hand, when the protrusion disengages from the recesses, rotation of the rotating part is no longer prevented by the protrusion and the rotating part becomes allowed to rotate freely.

When the protrusion is engaged with one of the recesses, rotation of the rotating part is prevented. Therefore when force to rotate the rotating part, either exerted from the outside or generated by changes in the pressure of the fluid, is applied to the rotating part, rotation of the member is hindered. As a result, the valve member, connected to the rotating part, is kept in a locked state.

Accordingly, the present invention provides a lock device and a valve device with a rotating part whose rotation is prevented even when force to rotate the rotating part, either exerted from the outside or generated by changes in the pressure of the fluid, is applied to the rotating part, which keeps the valve member, connected to the rotating part, in a locked state.

The preferable lock device according to the present invention is fitted to a valve device which comprises a valve member-fixing part having a valve member at one end and a guide groove, a rotating part with a moving projection inserted into the guide groove, a rotating part holder for rotatably holding the rotating part, and an operating part for rotating the rotating part. The lock device has a tubular member to be fitted to the rotating part.

When the rotating part, which is held by the rotating part holder, of the valve device is rotated around the central axis of the rotating part by operation of the operating part, the moving projection moves in the guide groove. The movement of the moving projection in the guide groove, in turn, moves the valve member-fixing part in either direction along the central axis thereof. This movement of the valve member-fixing part shifts the valve member between the obstructing position and the communicating position. Also, the valve member may be placed at any position between the obstructing and communicating positions depending on the degree of the turning of the operating part.

The tubular member of the preferable lock device according to the present invention has a first protrusion, such as a pin, formed on the inner circumferential face thereof, and the first protrusion engages with or disengages from first recesses, such as longitudinal grooves, formed in the outer circumferential face of the rotating part holder along the central axis thereof, when the tubular member moves in either direction. Alternatively, the tubular member has second recesses, such as grooves, formed in the inner circumferential face of the tubular member along the central axis thereof, and the second recesses engage with or disengage from a second protrusion, such as a pin, formed on the outer circumferential face of the rotating part holder along the central axis thereof, as the tubular member moves in either direction.

When the protrusion engages with one of the recesses, the rotating part is prevented from rotating. On the other hand, when the protrusion disengages from the recesses, rotation of the rotating part is no longer prevented by the protrusion and the rotating part becomes allowed to rotate freely.

Valve devices which have the valve member-fixing part, yet do not have the tubular member may not work properly, should the pressure of the fluid passing through the valve device from the inlet port to the outlet port be increased for some reasons. Specifically, as a result of the increase in the pressure of the flowing fluid exerted on the valve member-fixing part, the moving projection moves in the groove, which makes the valve member-fixing part itself move along the central axis thereof. This movement of the valve member-fixing part changes the position of the valve member and therefore the flow rate of the fluid.

The valve device of the present invention, which is provided with the lock device of the present invention, is capable of maintaining the state where the rotating part is locked. In more detail, when the movement of the rotating part is stopped and the position thereof is locked with the recesses or the protrusion formed on the rotating part holder engaged with the protrusion or the recesses formed in the tubular member, some force exerted on the operating part from the outside or changes in the pressure of fluid flowing through the valve device will neither move the valve member-fixing part along the central axis thereof nor turn the rotating part. Thus the valve device maintains the state in which the rotating part is locked.

The present invention provides a lock device and a valve device capable of withstanding force exerted from the outside or changes in the pressure of fluid flowing through the valve device, and capable of maintaining the locked state of the rotating part, in which state the rotating part is not turned or the valve member-fixing part is not moved in either direction along the central axis thereof, once the movement of the rotating part is stopped and the position of the valve member-fixing part is locked.

EMBODIMENTS TO CARRY OUT THE INVENTION

We will explain the invention in detail, referring to the attached figures.

Figure 1:
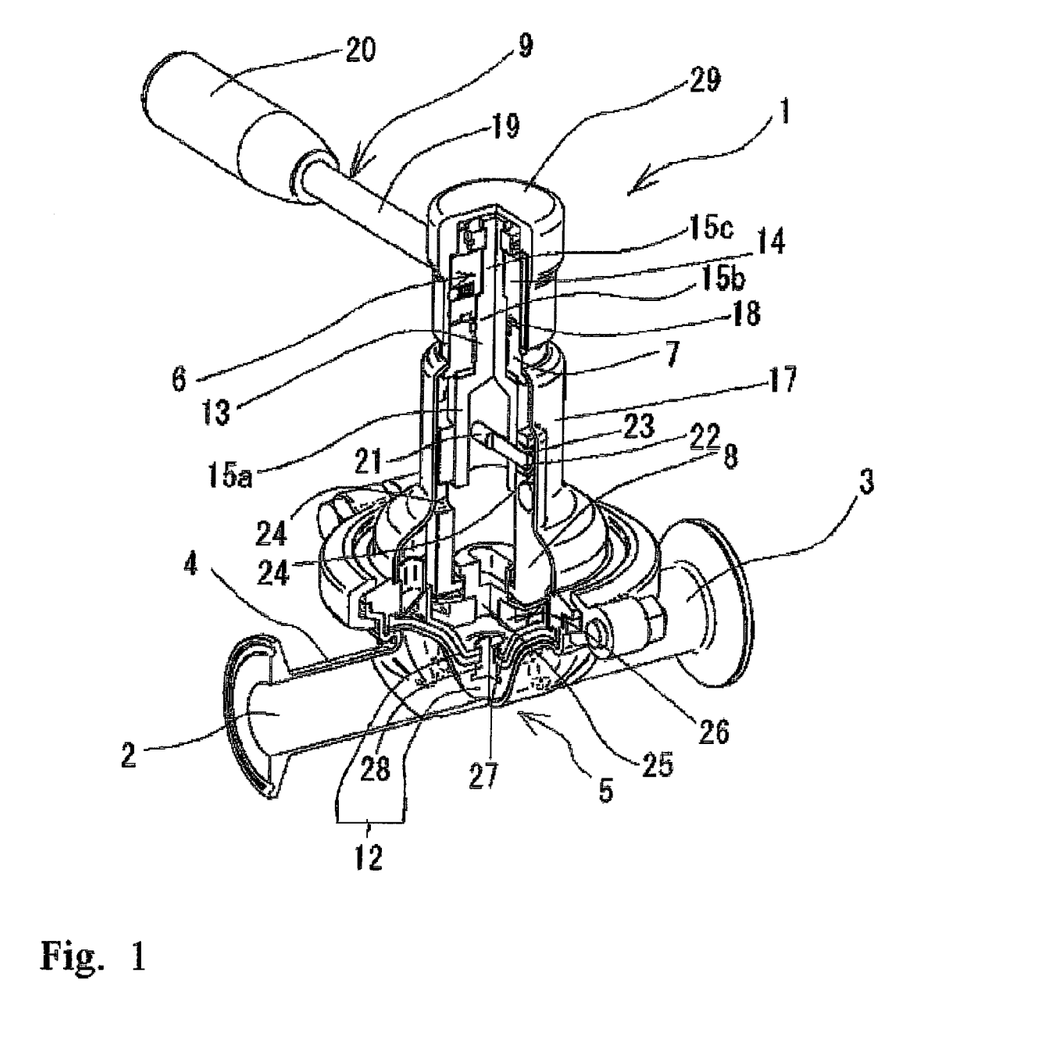
FIG. 1 is a partially cut away view of an example of the valve device according to the present invention, in which part of the device is cut way and the resulting section is exposed.

As shown in FIG. 1, a valve device 1, which is an example of the present invention, is mounted on a valve body 4 having an inlet port 2 and an outlet port 3, and the valve device has a valve member 5, a rotating part 6, a rotating part holder 7, a valve member-fixing part 8, and an operating part 9.

The valve body 4 is a pipe which has the inlet port 2, the inlet of fluid, and the outlet port 3, the outlet of the fluid. Fluid flows through the pipe. The valve device 1 is mounted on the central upper face of the pipe.

The valve member 5 has a diaphragm 12, which may be made of an elastic material excellent in flexibility, corrosion resistance, and heat resistance.

Preferable examples of the elastic material may include synthesized resins such as polytetrafluoroethylene (PTFE) resin, polychlorotrifluoroethylene (PCTFE) resin, and tetrafluoroethylene-perfluoroalkylvinylether copolymer (PFA) resin, and rubbers such as natural rubber, nitrile rubber, styrene rubber, butadiene-isobutylene synthetic rubber, polychloroprene rubber, butyl rubber, silicone rubber, polyurethane rubber, fluorine-containing rubber (FPM), and ethylene-propylene-diene monomer rubber (EPDM).

The rotating part 6 has a stem 13 and a stem head 14.

The stem 13 comprises a large-diameter portion 15a having an external appearance of a cylindrical tube; a middle-diameter portion 15b having an external appearance of a cylinder with a diameter smaller than the diameter of the large-diameter portion 15a, the middle-diameter portion 15b standing on a closed end of the large-diameter portion 15a so that they form a one-piece article with a stepwise section; and a small-diameter portion 15c having an external appearance of a cylinder with a diameter smaller than the diameter of the middle-diameter portion 15b, the small-diameter portion 15c standing on the free end of the middle-diameter portion 15b so that they form a one-piece article with a stepwise section.

The large-diameter portion 15a is housed in a bonnet 17. The middle-diameter portion 15b is inserted into an insertion hole formed in the rotating part holder 7. The part of the middle-diameter portion 15b that extends out from the insertion hole and the small-diameter portion 15c are inserted into a through hole formed in the stem head 14. The small-diameter portion 15c is secured to the stem head 14, so that the stem head 14 turns together with the small-diameter portion 15c when the stem 13 is rotated around its central axis.

Figure 4:
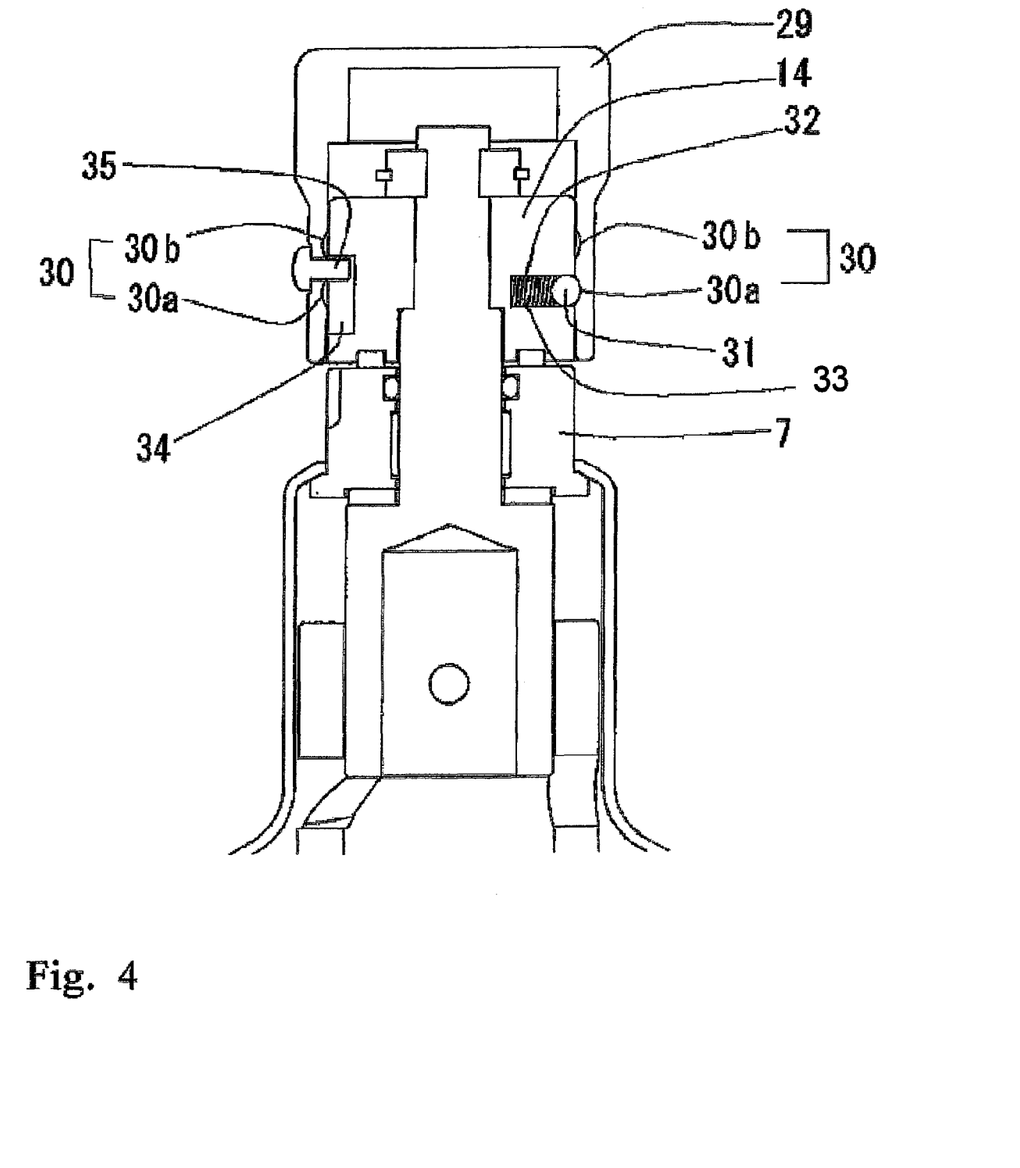
FIG. 4 is a sectional view showing an upper part of the valve device according to the present invention, in which the cylindrical tube is moved in such a direction that the rotating part holder is exposed.
Figure 5:
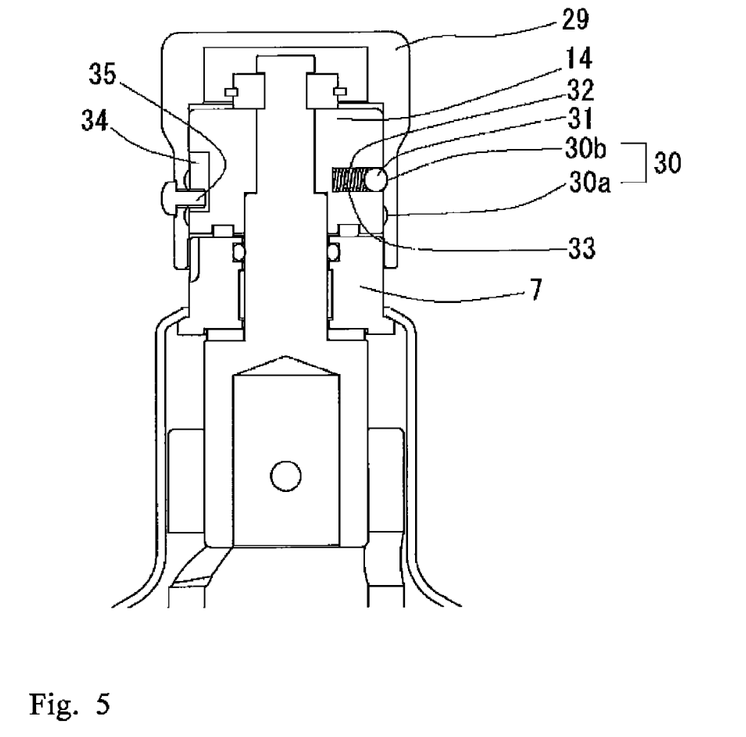
FIG. 5 is a sectional view showing an upper part of the valve device according to the present invention, in which the cylindrical tube is moved in the reverse direction so that the stem head and the rotating part holder are covered with the cylindrical tube.

As shown in FIGS. 1, 4, and 5, the rotating part holder 7 has the insertion hole pierced from one end to the other end, or from the lower end to the upper end in the figures. Although the rotating part holder 7 is welded to the bonnet 17 in such a manner that the entire rotating part holder 7 sticks out from the upper opening of the bonnet 17, the rotating part holder and the bonnet 17 may be formed in one piece.

The external diameter of the rotating part holder 7 is designed to be the same as that of the stem head 14. Thus, when the stem head 14 is placed on the rotating part holder 7 with their central axes aligned, or the stem, head 14 is laid on top of the rotating part holder 7, the outer circumferential face of the rotating part holder 7 is flush with that of the stem head 14. One end of the stem head 14, which is the lower end in FIG. 1, and one end of the rotating part holder 7, which is the upper end in FIG. 1, are arranged in such a manner that the ends face each other and they are in close proximity to each other. Between the lower end of the stem head 14 and the upper end of the rotating part holder 7 is placed a sheet 18 in the shape of an annular plate. The stem head 14 is capable of rotating smoothly on the sheet 18, with facing the upper end of the rotating part holder 7 that is secured to the wall surrounding the upper opening of the bonnet 17.

To the outer circumferential face of the stem head 14 is fixed a lever 19 in the shape of an elongated rod, which extends perpendicularly to the central axis of the stem head 14, or that of the stem 13. The lever 19 is provided with a grip 20 at the opposite end thereof, or the end that does not connected with the stem head 14. The operating part 9 according to this invention comprises the lever 19 and the grip 20. The lever 19 may be integrally connected to the stem head 14 by screwing; a female thread may be formed in the circumferential face of the stem head 14, a male thread may be formed on the stem-head side end of the lever; and the male thread may be driven into the female thread. The stem head 14 will be explained in detail hereinafter.

The valve member-fixing part 8 is formed in the shape of a general hollow cylinder with one end open. In the embodiment shown in FIG. 1, the upper end of the valve member-fixing part is open. The large-diameter portion 15a of the stem is inserted into the upper opening of the hollow cylinder of the valve member-fixing part 8 in such a manner that the outer circumferential face of the large-diameter portion 15a is capable of sliding on the inner circumferential face of the valve member-fixing part 8.

Figure 2:
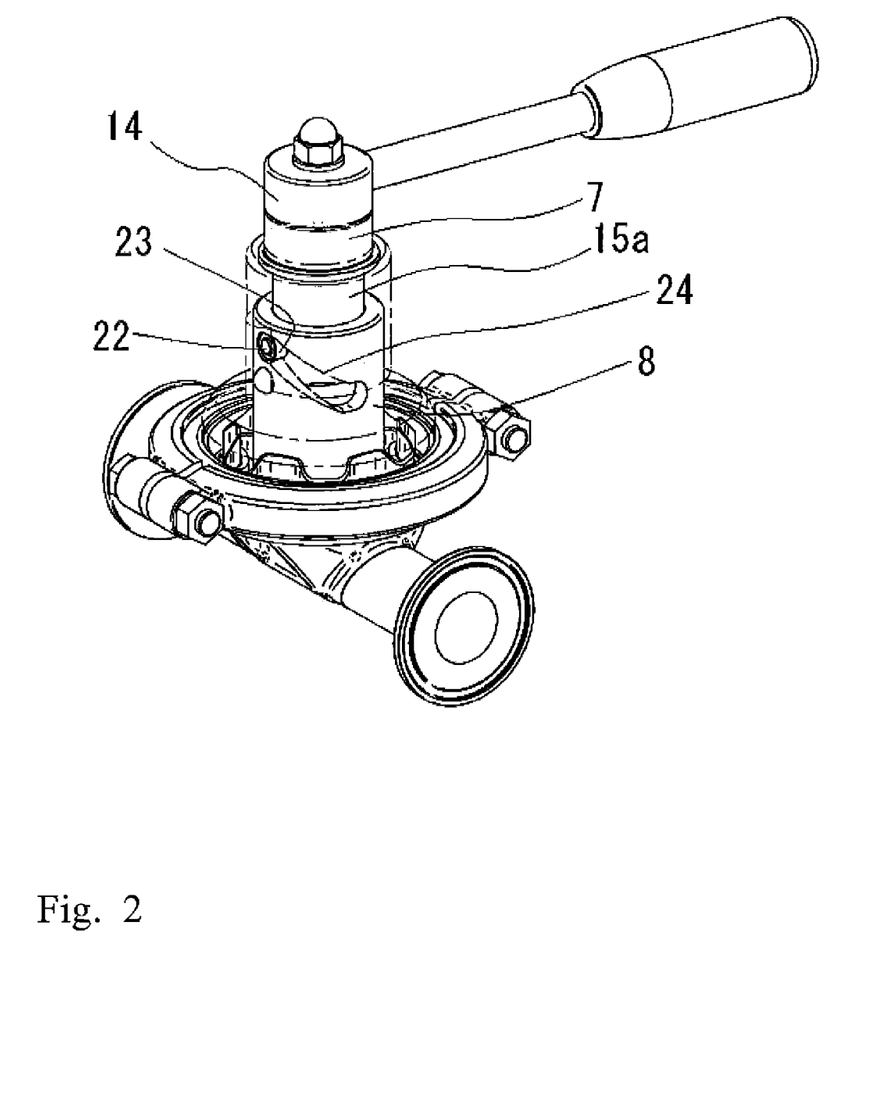
FIG. 2 is a perspective view of an example of the valve device according to the present invention, in which the bonnet is removed.

The large-diameter portion 15a has a pin 21 extending along the diameter of the portion and projecting outwardly from the outer circumferential face of the large-diameter portion 15a. As shown in FIG. 2, that part of the pin which projects from the outer circumferential face of the large-diameter portion 15a, or a projection 22, has a bearing 23 around it. The moving projection of the present invention comprises the projection 22 and the bearing 23. The moving projection is not limited to the combination of the projection 22 and the bearing 23; a protuberance sticking out from the outer circumferential face of the large-diameter portion 15a may be employed.

On the other hand, in the circumferential wall of the valve member-fixing part 8 is formed an elongated hole 24 that completely passes through the circumferential wall from the outer circumferential face to the inner circumferential face. The elongated hole 24 is inclined at a predetermined angle to the line perpendicular to the central axis of the valve member-fixing part 8. The moving projection, or the projection 22 provided with the bearing 23, is inserted into and arranged in the elongated hole 24. The angle of inclination of the elongated hole 24 may be determined depending on the length of the central axis of the valve member-fixing part 8 between a first position and a second position; the first position is the position at which the valve member 5 obstructs the flow path, or the valve member-fixing part 8 moves forward to the limit from the large-diameter portion 15a, and the second position is the position at which the inlet port and the outlet port completely communicate with each other, or the valve member-fixing part 8 completely retreats onto the large-diameter portion 15a of the stem.

The valve member-fixing part 8 of the valve device 1 shown in FIG. 1 has two elongated holes 24 in the circumferential wall thereof. Each end of the pin 21 is inserted into each of the two elongated holes 24 and serves as a projection 22. A bearing 23 is fitted to the outer circumferential face of each projection 22. The projection 22 provided with the bearing 23 is thus inserted into each elongated hole 24, which enables the large-diameter portion 15a to provide the valve member-fixing part 8 with uniform rotating force by the rotation of the large-diameter portion and to rotate the valve member-fixing part 8 smoothly.

The valve member-fixing part 8 also has a compressor 27, which may be sometimes called a pressurizing piece, at its bottom with a joint 25 and a joint cover 26 in between.

A diaphragm 12 is connected to the lower face of the compressor 27 with a connecting member such as a bolt 28.

Thus, the valve member 5 is fixed to the compressor 27, which is attached to the bottom of the valve member-fixing part 8 with the joint 25 and joint cover 26 in between. This structure enables the valve member 5 to vertically move without any rotation even when the valve member-fixing part 5 moves vertically while it is also turning.

As shown in FIGS. 1, 2, 4, and 5, the lock device, an example of the present invention, has a tubular member, such as a cylindrical tube, especially a closed cylindrical tube 29, which is fixed to the rotating part 6 so that the tubular member is capable of moving upward and downward along the central axis of the rotating part 6.

In the example shown in the figures, the closed cylindrical tube 29 is in the shape of a hollow cylinder with one end open and the other end closed.

The internal diameter of the closed cylindrical tube 29 is decided so that the stem head 14 of the rotating part 6 and the rotating part holder 7 can be smoothly inserted into the closed cylindrical tube from the end opening, as shown in FIGS. 4 and 5. In the inner circumferential face of the closed cylindrical tube 29 are annularly formed two engaging recesses 30, or upper and lower engaging recesses, each making a full circle along the inner circumferential face with the central axis of the cylinder made the center of the circle. Of these two engaging recesses 30, the one closer to the end opening of the closed cylindrical tube 29 is the lower recess 30*a* and the other formed on the side of the closed end of the closed cylindrical tube 29 is the upper recess 30*b*. The section of the lower recess 30*a* and that of the upper recess 30*b* each taken along a plane that includes the central axis of the closed cylindrical tube is in the shape of a circular arc. This particular shape of the recesses enables an engaging ball 31, which will be explained hereinafter, to be received in the recesses without unsteadiness. The respective locations of the lower recess 30*a* and the upper recess 30*b* should be decided suitably in light of the position at which the engaging ball 31 is fitted. Specifically, the following should be taken into consideration: The closed cylindrical tube 29 should not cover the outer circumferential face of the rotating part holder 7 when the engaging ball is received in the lower recess 30*a*, and the closed cylindrical tube 29 should cover the outer circumferential face of the rotating part holder 7 when the engaging ball is received in the upper recess 30*b*.

A hole 32 extending along the radius of the stem head 14 is formed in the outer circumferential face of the stem head 14. In the hole 32 are loaded a biasing member, such as a coil spring 33, and an engaging ball 31 biased by the coil spring 33. See FIGS. 4 and 5. When the closed cylindrical tube 29 moves along the central axis of the stem head 14 and this movement makes the engaging ball 31 be headed to the upper recess 30*b* or the lower recess 30*a*, urging force exerted by the coil spring 33 makes the engaging ball 31 fall in the upper recess 30*b* or the lower recess 30*a*. On the other hand, when the engaging ball 31 faces the outer circumferential face of the closed cylindrical tube 29 between the upper recess 30*b* and the lower recess 30*a*, the engaging ball 31 partly retracts into the hole 32, resisting the urging force of the coil spring 33. In short, the stem head 14 is provided with the engaging ball 31 in such a manner that the ball is capable of sticking out of the outer circumferential face of the stem head and of also retracting into the stem head.

Thus, when the closed cylindrical tube 29 is moved from the stem head 14 to the rotating part holder 7 along the central axis thereof, the engaging ball 31, which has been received in the lower recess 30*a*, smoothly rolls on the inner circumferential face of the closed cylindrical tube 29 from the lower recess 30*a* to the upper recess 30*b*, and then falls in the upper recess 30*b*. Also, when the closed cylindrical tube 29 is moved from the rotating part holder 7 to the stem head 14 along the central axis thereof, the engaging ball 31, which has been received in the upper recess 30*b*, smoothly rolls on the inner circumferential face of the closed cylindrical tube 29 from the upper recess 30*b* to the lower recess 30*a*, and then falls in the lower recess 30*a*. The user can certainly recognize, through the feeling in his/her operating hand, that the closed cylindrical tube 29 is placed at predetermined positions.

As shown in FIG. 4, a longitudinally elongated groove 34 is formed in the outer circumferential face of the stem head 14. The end of a screw 35, which is screwed into a tapped hole pierced through the circumferential wall of the closed cylindrical tube 29, is received in this longitudinally elongated groove 34. The combination of the longitudinally elongated groove 34 and the screw 35 prevents the closed cylindrical tube 29 from slipping off the stem head 14 and also from covering the rotating part holder 7 over and above what is needed. In other words, the engagement of the screw 35, an example of the engaging member of the present invention, with the groove 34, an example of the elongated groove of this invention, makes it impossible for the closed cylindrical tube 29 to slip off the rotating part 6.

Figure 3:
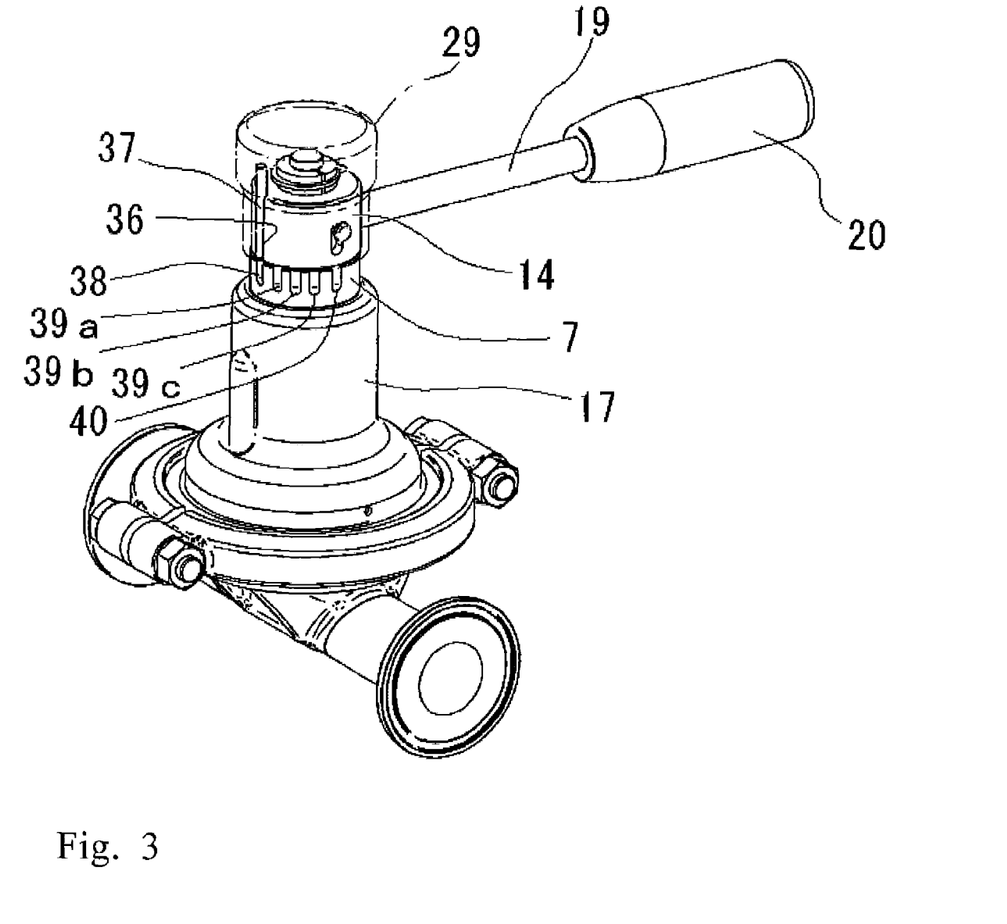
FIG. 3 is a perspective view of an example of the valve device according to the present invention, in which the cylindrical tube is removed with its protrusion left.

As shown in FIG. 3, a pin-fixing groove 36, or a groove to which a pin is fixed, is formed in the inner circumferential face of the closed cylindrical tube 29 in such a manner that the groove runs parallel with the central axis of the closed cylindrical tube 29. The section of the pin-fixing groove 36 taken along a plane perpendicular to the central axis of the closed cylindrical tube 29 is in the shape of a semicircle. A pin 37 is fixed to the pin-fixing groove 36. Specifically, in a sectional view taken along a plane perpendicular to the axis of the pin 37, one semicircular portion of the pin is received in the pin-fixing groove 36, and the other semicircular portion ridges on the inner circumferential face of the closed cylindrical tube 29. The semicircular portion of the pin 37 ridged on the inner circumferential face of the closed cylindrical tube 29 is an example of the first protrusion of the present invention.

On the other hand, five longitudinal grooves 38, 39*a*, 39*b*, 39*c*, and 40 that are parallel with the central axis of the rotating part holder 7 are formed in the outer circumferential face thereof, as shown in FIG. 3. These five longitudinal grooves 38, 39*a*, 39*b*, 39*c*, and 40 have the same shape. Let us take up the groove 38 for explanation. The longitudinal groove 38 opens at one end of the rotating part holder 7, or the end facing the opposing face of the stem head 14. The groove is formed in the outer circumferential face of the rotating part holder 7 so that the groove is parallel with the central axis of the holder 7 and it has a predetermined length. The length should be such that the groove is capable of receiving the ridged portion of the pin 37, which is fixed to the inner circumferential face of the closed cylindrical tube 29, when the rotating part holder 7 is covered with the closed cylindrical tube 29.

Among the five longitudinal grooves 38, 39*a*, 39*b*, 39*c*, and 40 running side by side, the location of the groove 38 is decided so that the groove is used when the valve member 5 of the valve device 1 obstructs the flow path. Normally, the longitudinal groove 38 is formed at such a position that the pin 37 engages with the longitudinal groove 38 when the lever 19 is positioned so as to extend perpendicular to a general linear flow path including the inlet port 2 and the outlet port 3. The location of the longitudinal groove 38 shows the valve member obstructs the flow path. Thus the longitudinal groove 38 is an example of the first longitudinal groove of the present invention.

Among the five longitudinal grooves 38, 39*a*, 39*b*, 39*c*, and 40 running side by side, the location of the groove 40 is decided so that the groove is used when the valve member 5 of the valve device 1 allows the inlet port and the outlet port to completely communicate with each other. Normally, the longitudinal groove 40 is formed at such a position that the pin 37 engages with the longitudinal groove 40 when the lever 19 is positioned so as to extend along the general linear flow path including the inlet port 2 and the outlet port 3. The location of the longitudinal groove 40 shows that the valve member allows the inlet port and the outlet port to fully communicate with each other. Thus the longitudinal groove 40 is an example of the second longitudinal groove of the present invention.

Among the five longitudinal grooves 38, 39a, 39b, 39c, and 40 running side by side, the respective locations of the three grooves 39a, 39b, 39c are decided so that the valve member 5 occupies positions between the completely obstructing position and the fully communicating position.

The lock device and the valve device, which have been explained so far, work in the following way:

Let us suppose that at an initial stage the stem head 14 is housed in the closed cylindrical tube 29 and the outer circumferential face of the rotating part holder 7 is not covered with the closed cylindrical tube 29, as shown in FIG. 4. At this initial stage, the valve member-fixing part 8 is completely pulled down by the large diameter portion 15a of the stem 13. Thus the flow path of the valve device 1 is completely obstructed by the valve member 5.

In order to change the position of the valve member 5 from the obstructing position to the fully communicating position, operate the device in the following way:

Apply force by hand to the grip 20 and turn the lever 19 counterclockwise, as shown in FIGS. 1-3.

As the lever 19 turns, the stem head 14 and the stem 13 rotate counterclockwise simultaneously. The rotating part holder 7 does not rotate. The rotation of the stem 13 is accompanied by that of the large-diameter portion 15a in the counterclockwise direction. The rotation of the large-diameter portion 15a causes a simultaneous rotation of the projections 22 of the pin 21. Because the projections 22 are inserted in the corresponding elongated holes 24 and the projections 22 rotate in a plane perpendicular to the central axis of the large-diameter portion 15a, the valve member-fixing part 8 ascends along the central axis thereof as the projections 22 rotate. The valve member-fixing part 8 does not rotate when it begins to ascend.

As the lever 19 is further turned, the large-diameter portion 15a is further rotated. The valve member-fixing part 8 continues to ascend as the large-diameter portion 15a turns. When the lever 19 is positioned so that it extends along the flow path, the valve member-fixing part 8 is in the state that the part finished ascending and it is at its top position. When the valve member-fixing part 8 is in this state, the valve body 5, which is connected to the valve member-fixing part 8 with the joint 25, the joint cover 26, and the compressor 27 in between, leaves the flow path fully open, or allows fluid to freely flow through the path with no obstruction.

The closed cylindrical tube 29 is lowered so that this state in which the flow path is fully open is fixed and maintained. The lowering of the closed cylindrical tube 29 pushes the engaging ball 31, which has been engaged with the lower recess 30a, off the recess 30a. Resisting the urging force of the coil spring 33, the ball 31 is pushed into the hole 32. When the closed cylindrical tube 29 is further lowered, the engaging ball 31 rolls on the inner circumferential face of the closed cylindrical tube 29 toward the upper recess 30b. A further lowering of the closed cylindrical tube 29 places the engaging ball 31 at the upper recess 30b. Then, the engaging ball 31 is pushed into the upper recess 30b by the urging force of the coil spring 33. When the lowering of the closed cylindrical tube 29 is made by hand, the operator is capable of feeling a subtle resistance generated by the urged engagement of the ball 31 with the upper recess 30b and s/he stops further lowering of the closed cylindrical tube 29.

When the engaging ball 31 is received in the upper recess 30b of the closed cylindrical tube 29, the pin 37 is engaged with the second longitudinal groove 40.

In other words, the rotating part holder 7, which is secured to the bonnet so as not to be rotatable, and the stem head 14 are coupled by means of the pin 37, so that the rotating part 6 having the stem head 14 and the stem 13 is made non-rotatable.

When the closed cylindrical tube 29 is not moved toward the rotating part holder 7 and the outer circumferential face of the holder is exposed, the rotating part 6 is not locked. Thus, when the pressure of fluid in the flow path drops or when external force to turn the lever 19 clockwise is applied to the lever, the rotating part 6 is rotated. As a result, the degree of the communication between the inlet port and the outlet port, controlled by the valve body 5, is changed from the full communication to a partial communication depending on the angle of the rotation of the rotating part 6.

In the case where the rotating part 6 is locked by the closed cylindrical tube 29, either when the pressure of fluid in the flow path drops or when external force to turn the lever 19 clockwise is applied to the lever, the rotating part 6 is not rotated. As a result, the position of the valve member 5 is kept unchanged, which ensures the full communication of the inlet port and the outlet port, one ultimate state controlled by the valve member 5.

In order to change the position of the valve member 5 from the fully communicating position to a partly communicating position, which is not the completely obstructing position, operate the device in the following way:

Draw up the closed cylindrical tube 29, which covers the outer circumferential face of the rotating part holder 7 and whose pin 37 is engaged with the second longitudinal groove 40, along the central axis thereof. The closed cylindrical tube 29 is drawn up until the engaging ball 31, which has been received in the upper recess 30b, falls in the lower recess 30a. Then, the pin 37 becomes released from the engagement with the second longitudinal groove 40, which enables the rotating part 6 having the stem head 14 and stem 13 to rotate freely in relation to the rotating part holder 7.

Subsequently, turn the lever 19 clockwise to rotate the rotating part 6. When the rotating part 6 is rotated, the projections 22 each provided with a bearing 23 move in the elongated holes 24. This movement of the projections 22 lowers the valve member-fixing part 8 along the central axis thereof, and the descending movement of the valve member-fixing part 8 also lowers the valve member 5. Because the valve member 5 is lowered, the fully communicating state of the flow path is gradually changed to a partly communicating state thereof. In other words, the valve member 5 is moved from the fully communicating position to a partly communicating position.

After stopping the turning of the lever 19, the closed cylindrical tube 29 is lowered along the central axis thereof so that the pin 37 is slid into, for example, the longitudinal groove 39a. When the closed cylindrical tube 29 is completely lowered, the pin 37 wholly engages with the longitudinal groove 39a. As a result, the stem head 14 is integrally coupled with the rotating part holder 7 and is made non-rotatable.

When the rotating part 6 including the stem head 14 is in a non-rotatable state in this manner, changes in the pressure of fluid in the flow path and an application of external force that rotates the lever 19 clockwise or counterclockwise to the lever 19 are not able to rotate the rotating part 6. As a result, the position of the valve member 5 is kept unchanged and the partly communicating state created by the valve member 5 is maintained.

As explained hereinbefore, the engagement of the protrusion of the closed cylindrical tube with one of the longitudinal grooves formed in the rotating part holder makes the position of the valve member unchangeable. Even if the pressure exerted to the valve member is changed, which may be caused by an increase or decrease in the pressure of fluid flowing through the flow path, or external force to rotate the rotating part in either direction is applied to the lever, the position of the valve member remains unchanged.

We have explained one example of the valve device and the lock device according to the present invention hereinbefore. However, the invention is not limited to the example.

The valve device shown in FIGS. 1-5 is a diaphragm valve. The lock device of the present invention, however, is applicable to any valve device which comprises a valve member placed in a valve body having an inlet port and an outlet port, the valve member for obstructing the inlet port and the outlet port or allowing the inlet port and the outlet port to communicate with each other; a rotating part for moving the valve member so as to place the valve member at an obstructing position or at a communicating position, the rotating part rotating around the central axis thereof; a rotating part holder for holding the rotating part in a rotatable manner; and an operating part for rotating the rotating part; the valve device being under such conditions that the position of the valve member may be changed by external force, the pressure of the fluid applied to the valve member, or other factors. Examples of the valve device may include diaphragm valves, butterfly valves, globe valves, ball valves, and gate valves.

Also, the lock device according to the present invention is applicable to a valve device, such as a diaphragm valve, which comprises a valve member placed in a valve body having an inlet port and an outlet port, the valve member for obstructing the inlet port and the outlet port or allowing the inlet port and the outlet port to communicate with each other; a rotating part for moving the valve member so as to place the valve member at an obstructing position or at a communicating position, the rotating part rotating around the central axis thereof; a rotating part holder for holding the rotating part in a rotatable manner; an operating part for rotating the rotating part; and a valve member-fixing part having the rotating part on one end and the valve member on the other end; wherein a guide groove is formed in the valve member-fixing part, the rotating part has a moving projection inserted in the guide groove; and when the rotating part is rotated, the moving projection moves in the guide groove, which changes the relative position of the valve member-fixing part to the rotating part, thereby moving the valve member at least to the obstructing position and the communicating position.

There is no limitation on the structure of the diaphragm, as long as it is capable of obstructing the flow path and allowing fluid flow in the path. The diaphragm may be made of a single elastic sheet or of a few or several elastic sheets. A preferable diaphragm may be a two-layer diaphragm made of a synthetic resin sheet layered on a rubber sheet.

The tubular member of the lock device according to the present invention is not limited to the closed cylindrical tube shown in the figures, as long as the cylindrical tube is capable of being fitted to the rotating part so as to be movable in both directions along the central axis of the rotating part, wherein the rotating part capable of rotating itself so that the valve member is moved between the obstructing position and the communicating position is a component of a valve device which also has a rotating part holder that holds the rotating part in a rotatable manner yet does not rotate itself. The tubular member will be satisfactory if it is capable of moving on the surface of the rotating part holder and that of the rotating part, wherein the rotating part holder and the rotating part are arranged in such a manner that they have a common central axis, along the common central axis in both directions so as to create a state in which the rotating part holder and the rotating part are covered with the tubular member and a state in which the rotating part holder is not covered with the member. Thus, depending on the external shape of the rotating part holder and that of the rotating part, the tubular member may be in the shape of a prismatic tube.

The lock device and the valve device equipped with the lock device shown in the figures have a structure in which the tubular member and the rotating part holder make the rotating part rotatable or non-rotatable by means of the engagement of a recess with a protrusion. Thus the structure is not limited to the embodiment shown in the figures where a protrusion, such as a pin, is fixed to the inner circumferential face of the tubular member, and recesses, such as grooves, are formed in the outer circumferential face of the rotating part holder. The structure may be modified so that recesses, such as grooves, are formed in the inner circumferential face of the tubular member, and a protrusion, such as a pin, is formed in the outer circumferential face of the rotating part holder. Also, a protrusion, formed on the inner circumferential face of the tubular member or on the outer circumferential face of the rotating part holder, may be designed so as to retract into the tubular member or the rotating part holder when the protrusion moves on the area of the face in which the recesses are not formed and to rise up from the face of the tubular member or rotating part holder when the protrusion meets a recess, in the process where the tubular member moves in either direction along the central axis.

The preferable lock device and the valve device shown in the figures have the three longitudinal grooves 39a, 39b, and 39c. However, the number of the longitudinal grooves is not limited to three; the device may have any number, such as two, four, or five, of longitudinal grooves. Alternatively, the device may have only the first longitudinal groove 38 and the second longitudinal groove 40, without the three intermediate longitudinal grooves.

For the protrusion, which engages with the longitudinal grooves and disengages therefrom of the lock device according to the present invention, may be employed any element with various shapes and structures other than the pin 37, as long as the protrusion is formed in the inner circumferential face of the tubular member in such a manner that the protrusion is capable of engaging with the longitudinal grooves and the protrusion is capable of imposing restraints on the rotation of the tubular member by its engagement with the longitudinal grooves.

EXPLANATION OF REFERENCE NUMERALS 1 valve device
2 inlet port
3 outlet port
4 valve body
5 valve member
6 rotating part
7 rotating part holder 8 valve member-fixing part
9 operating part
12 diaphragm
13 stem
14 stem head
15a large-diameter portion
15b middle-diameter portion
15c small-diameter portion
17 bonnet
18 sheet
19 lever
20 grip
21 pin
22 projection
23 bearing
24 elongated hole
25 joint
26 joint cover
27 compressor
28 bolt
29 closed cylindrical tube
30 engaging recess
30a lower recess
30b upper recess
31 engaging ball
32 hole
33 coil spring
34 groove
35 screw
36 pin-fixing groove
37 pin
38, 39a, 39b, 39c, 40 longitudinal groove

We claim:

1. A lock device applicable to a valve device comprising:
a valve member having a diaphragm and placed in a valve body having an inlet port and an outlet port, the valve member being configured to obstruct the inlet and outlet ports or to allow the inlet and outlet ports to communicate with each other,
a rotating part rotating around a central axis thereof, for driving the valve member so as to place the valve member at an obstructing position or at a communicating position,
a rotating part holder for holding the rotating part in such a way that the rotating part is rotatable, and
an operating part for rotating the rotating part,
the lock device comprising:
a tubular member fitted to the rotating part in such a manner that the tubular member is movable along the central axis of the rotating part in both directions,
wherein the tubular member has a protrusion which is formed on an inner circumferential face of the tubular member and has a longitudinal axis that extends parallel with a central axis of the tubular member, and the protrusion engages or disengages from a plurality of recesses which is formed in an outer circumferential face of the rotating part holder parallel with a central axis of the rotating part holder when the tubular member moves in either direction,
wherein the plurality of recesses is a plurality of longitudinal grooves which comprises at least a first longitudinal groove, a second longitudinal groove and a third longitudinal groove,
wherein the first longitudinal groove is formed corresponding to the obstructing position,
wherein the second longitudinal groove is formed corresponding to the communicating position, and
wherein the third longitudinal groove is disposed between the obstructing position and the communicating position.

2. The lock device according to claim 1, wherein the tubular member has an upper recess and a lower recess in the inner circumferential face thereof, the rotating part has an engaging ball capable of sticking out of and withdrawing from an outer circumferential face of the rotating part, and the engaging ball is capable of engaging the upper recess and the lower recess.

3. The lock device according to claim 1, the valve device further comprising a valve member-fixing part with the valve member at one end, wherein the valve member-fixing part has a guide groove and the rotating part has a moving projection inserted into the guide groove; and wherein the moving projection moves in the guide groove as the rotating part is rotated, so that the valve member-fixing part moves in relation to the rotating part, thereby shifting the valve member at least between the obstructing position and the communicating position.

4. The lock device according to claim 1, wherein the tubular member has an engaging member for engaging with a longitudinal groove running parallel with the central axis of the rotating part, the longitudinal groove formed in an outer circumferential face of the rotating part, whereby the tubular member is prevented from slipping off the rotating part.

5. The lock device according to claim 1, wherein the operating part comprises a lever.

6. A valve device comprising:
a valve member having a diaphragm and placed in a valve body having an inlet port and an outlet port, the valve member being configured to obstruct the inlet and outlet ports or to allow the inlet and outlet ports to communicate with each other,
a rotating part rotating around a central axis thereof, for driving the valve member so as to place the valve member at an obstructing position or at a communicating position,
a rotating part holder for holding the rotating part in such a way that the rotating part is rotatable,
an operating part for rotating the rotating part, and
a tubular member fitted to the rotating part in such a manner that the tubular member is movable along the central axis of the rotating part in both directions;
wherein the tubular member has a protrusion which is formed on an inner circumferential face of the tubular member and has a longitudinal axis that extends parallel with a central axis of the tubular member, and the protrusion engages or disengages from a plurality of recesses which is formed in an outer circumferential face of the rotating part holder parallel with a central axis of the rotating part holder when the tubular member moves in either direction,
wherein the plurality of recesses is a plurality of longitudinal grooves which comprises at least a first longitudinal groove, a second longitudinal groove and a third longitudinal groove,
wherein the first longitudinal groove is formed corresponding to the obstructing position,
wherein the second longitudinal groove is formed corresponding to the communicating position, and
wherein the third longitudinal groove is disposed between the obstructing position and the communicating position.

7. The valve device according to claim 6, wherein the tubular member has an upper recess and a lower recess in the inner circumferential face thereof, the rotating part has an engaging ball capable of sticking out of and withdrawing from an outer circumferential face of the rotating part, and the engaging ball is capable of engaging the upper recess and the lower recess.

8. The valve device according to claim 6, further including a valve member-fixing part with the valve member at one end, wherein the valve member-fixing part has a guide groove and the rotating part has a moving projection inserted into the guide groove; and wherein the moving projection moves in the guide groove as the rotating part is rotated, so that the valve member-fixing part moves in relation to the rotating part, thereby shifting the valve member at least between the obstructing position and the communicating position.

9. The valve device according to claim 6, wherein the tubular member has an engaging member for engaging a longitudinal groove running parallel with the central axis of the rotating part, the longitudinal groove formed in an outer circumferential face of the rotating part, whereby the tubular member is prevented from slipping off the rotating part.

10. The valve device according to claim 6, wherein the operating part comprises a lever.

11. A lock device applicable to a valve device comprising:
a valve member having a diaphragm and placed in a valve body having an inlet port and an outlet port, the valve member being configured to obstruct the inlet and outlet ports or to allow the inlet and outlet ports to communicate with each other,
a rotating part rotating around a central axis thereof, for driving the valve member so as to place the valve member at an obstructing position or at a communicating position,
a rotating part holder for holding the rotating part in such a way that the rotating part is rotatable, and
an operating part for rotating the rotating part,
the lock device comprising:
a tubular member fitted to the rotating part in such a manner that the tubular member is movable along the central axis of the rotating part in both directions, wherein the tubular member has a protrusion which is formed on an inner circumferential face of the tubular member and has a longitudinal axis that extends parallel with a central axis of the tubular member, and the protrusion engages or disengages from a plurality of recesses which is formed in an outer circumferential face of the rotating part holder parallel with a central axis of the rotating part holder when the tubular member moves in either direction,
wherein the plurality of recesses is a plurality of longitudinal grooves, and
wherein the protrusion is a pin which is disposed radially inward between the inner circumferential face of the tubular member and the outer circumferential face of the rotating part holder so as to be capable of engaging one of the plurality of longitudinal grooves and is independent of the tubular member.

12. The lock device according to claim 11,
wherein the plurality of longitudinal grooves comprises at least a first longitudinal groove, a second longitudinal groove and a third longitudinal groove,
wherein the first longitudinal groove is formed corresponding to the obstructing position,
wherein the second longitudinal groove is formed corresponding to the communicating position, and
wherein the third longitudinal groove is disposed between the obstructing position and the communicating position.

13. The lock device according to claim 11, wherein the operating part comprises a lever.

14. A valve device, comprising:
a valve member having a diaphragm and placed in a valve body having an inlet port and an outlet port, the valve member being configured to obstruct the inlet and outlet ports or to allow the inlet and outlet ports to communicate with each other,
a rotating part rotating around a central axis thereof, for driving the valve member so as to place the valve member at an obstructing position or at a communicating position,
a rotating part holder for holding the rotating part in such a way that the rotating part is rotatable,
an operating part for rotating the rotating part, and
a tubular member fitted to the rotating part in such a manner that the tubular member is movable along the central axis of the rotating part in both directions,
wherein the tubular member has a protrusion which is formed on an inner circumferential face of the tubular member and has a longitudinal axis that extends parallel with a central axis of the tubular member, and the protrusion engages or disengages from a plurality of recesses which is formed in an outer circumferential face of the rotating part holder parallel with a central axis of the rotating part holder when the tubular member moves in either direction,
wherein the plurality of recesses is a plurality of longitudinal grooves, and
wherein the protrusion is a pin which is disposed radially inward between the inner circumferential face of the tubular member and the outer circumferential face of the rotating part holder so as to be capable of engaging one of the plurality of longitudinal grooves and is independent of the tubular member.

15. The valve device according to claim 14,
wherein the plurality of longitudinal grooves comprises at least a first longitudinal groove, a second longitudinal groove and a third longitudinal groove,
wherein the first longitudinal groove is formed corresponding to the obstructing position,
wherein the second longitudinal groove is formed corresponding to the communicating position, and
wherein the third longitudinal groove is disposed between the obstructing position and the communicating position.

16. The valve device according to claim 14, wherein the operating part comprises a lever.

* * * * *